March 28, 1961 C. L. OKERLUND 2,977,011
BOAT TRAILER
Filed April 1, 1957 2 Sheets-Sheet 1
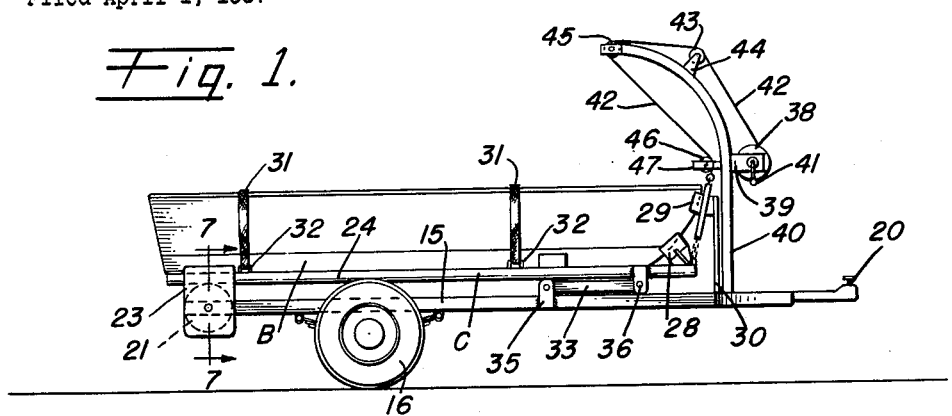
Fig. 1.
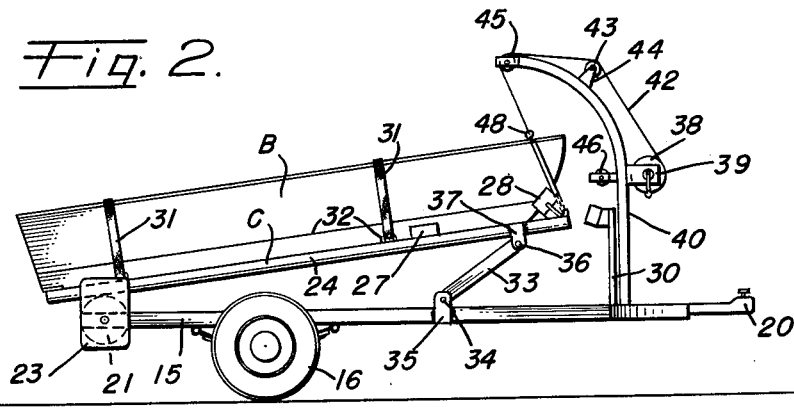
Fig. 2.
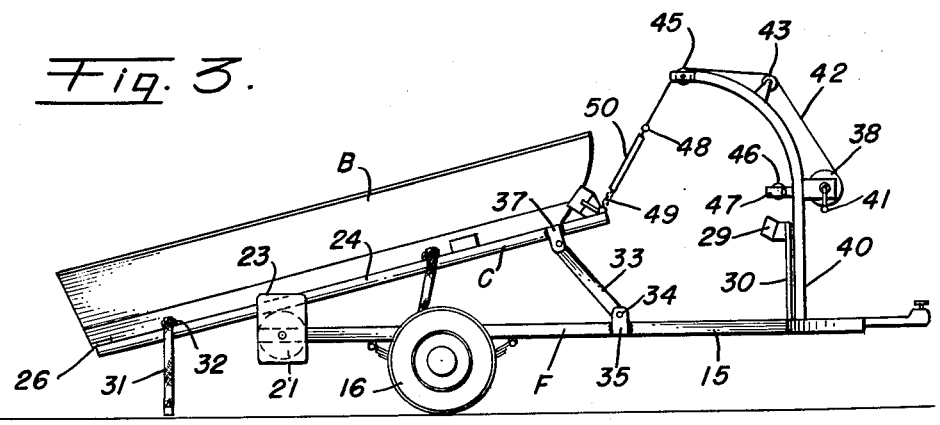
Fig. 3.
CHARLES L. OKERLUND,
INVENTOR.
BY 
Attorney

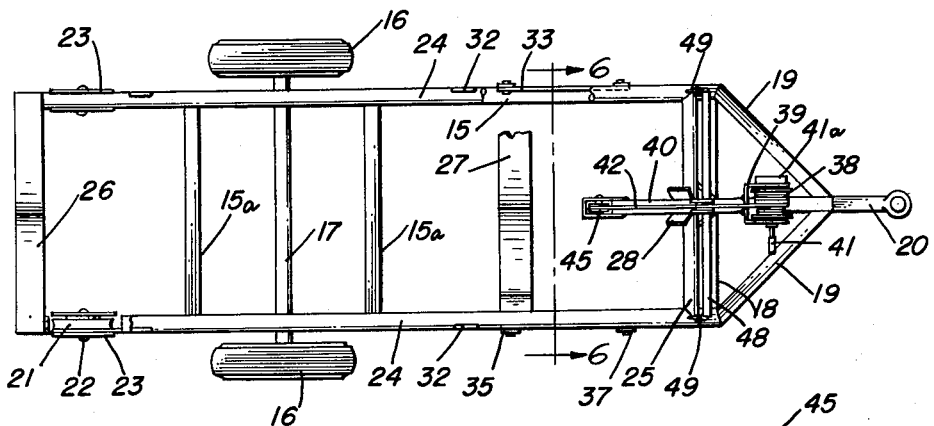
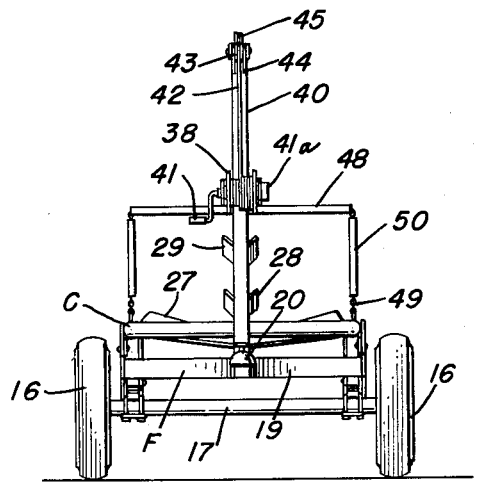
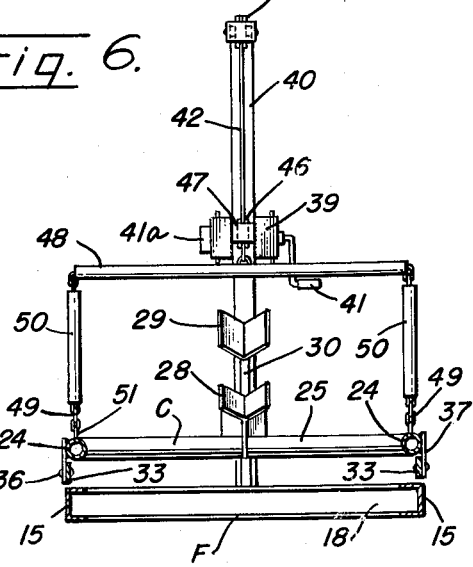
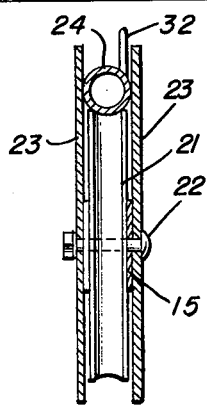

United States Patent Office 2,977,011
Patented Mar. 28, 1961

2,977,011

BOAT TRAILER

Charles L. Okerlund, 1030 Easum Drive, Napa, Calif.

Filed Apr. 1, 1957, Ser. No. 649,889

7 Claims. (Cl. 214—505)

My invention relates to boat trailers designed for transporting, launching and retrieving boats, and it has for a purpose the provision of a trailer-carried mechanism of simplified construction, by which a boat may be launched from the trailer and retrieved for carrying by one person and without the necessity of that person entering the water for either operation.

It is also a purpose of my invention to provide a trailer-carried mechanism of this character which embodies a boat-supporting cradle which is mounted on the trailer frame to normally occupy a horizontal position for transporting the boat by means of a towing vehicle connected to the trailer, and a tilted position for launching or retrieving of the boat, and means on the trailer manually operable to move the cradle to either of said positions.

It is a further purpose of my invention to provide a boat trailer having means by which the boat can be securely held against movement on the cradle, and the cradle secured in horizontal position on the trailer whereby possible damage to the boat while being transported, is prevented.

I will describe only one form of boat trailer including one form of mechanism embodying my invention for launching and retrieving a boat, and will then point out the novel features thereof in claims.

In the drawings:

Fig. 1 is a view showing in side elevation one form of boat trailer showing the cradle of my mechanism in boat transporting position and with a boat thereon.

Fig. 2 is a view similar to Fig. 1 showing the trailer tilted preparatory to launching of the boat.

Fig. 3 is a view similar to Fig. 2 showing the trailer further tilted for launching of the boat.

Fig. 4 is a top plan view of the boat trailer with the boat removed therefrom.

Fig. 5 is a front elevational view of the trailer.

Fig. 6 is a vertical sectional view taken on the line 6—6 of Fig. 4.

Fig. 7 is an enlarged vertical sectional view taken on the line 7—7 of Fig. 1.

Referring more particularly to the drawings, my invention in its present embodiment comprises a trailer frame F made up of a pair of parallel spaced side beams 15 supported on wheels 16 carried by the ends of an axle 17. The beams 15 are rigidly connected to each other by cross beams 15a and at their front end by a transverse beam 18, and a pair of converging beams 19 are secured to and project from the forward ends of the side beams. A trailer hitch 20 is connected to the meeting ends of the beams 19. At the rear ends of the side beams 15, a pair of grooved rollers 21 are rotatably mounted on axles 22 each between a pair of guide plates 23 and extending through the plates and through the rear end of the respective beam 15 to mount both the plates and the roller on the beam.

A boat-carrying cradle, carriage or frame C is mounted on the trailer frame F for movement to occupy a horizontal position for transporting the boat, or a tilted position for launching of the boat or retrieving it back on the trailer. This cradle C is made up of a pair of longitudinal side members 24 connected at their forward ends in parallel spaced relation by a cross member 25. These members 24 and 25 may be in the form of steel tubing as illustrated.

The rear ends of the side members 24 are rigidly connected by a V-shaped bolster 26, and a second bolster 27 of like form rigidly connects the side members at a point between their ends adjacent the cross member 25. Secured to the transverse member 25 medially of the ends thereof is a boat chock 28. A second boat chock 29 is fixed to the upper end of a post 30 secured to the transverse beam 18 of the trailer frame.

The bolsters 26 and 27 coact to support a boat B against lateral movement on the cradle C, while the chocks 28 and 29 support the bow end of the boat against forward movement on the cradle as shown in Fig. 1. To secure the boat against upward movement on the cradle C when transporting it, a pair of straps 31 secured to members 32 fixed on the side members 24, extend around the boat at spaced points along the length thereof.

The cradle C is supported for tilting movement, as well as rolling movement, on the trailer frame F. The means for supporting the cradle for tilting movement comprises a pair of arms or links 33, each link pivoted as at 34 in a bracket 35 fixed to one of the side beams 15. The other end of each link is pivoted as at 36 to a bracket 37 fixed to the respective side member 24 of the cradle C, and at a point adjacent the forward end thereof.

The cradle C is supported for rolling movement on the trailer frame by the rollers 21 since as clearly shown in Fig. 7 each side member 24 extends between the plates 23 and is supported on the roller 21.

For raising the cradle C to tilted position or restoring it to horizontal position, a winch and cable mechanism is provided which, in the present instance, comprises a winch drum 38 mounted in a bracket 39 fixed to a boom 40. This boom is secured at its lower end to the transverse beam 19, and as shown it is curved upwardly and rearwardly to locate its upper end at a point upwardly of the cradle C when latter is in horizontal position.

The winch also includes a crank 41 for rotating the drum and a pawl and gear contained in a housing 41a for latching the drum against rotation. A cable 42 is trained about the drum and extended upwardly over a pulley 43 mounted in a bracket 44 fixed to the boom 40. From pulley 43 the cable 42 is trained around a pulley 45 mounted in the upper end of the boom, and then downwardly around a pulley 46 mounted in a bracket 47 fixed to the boom 40. From the pulley 46 the cable 42 is connected, as best shown in Fig. 6, to a spreader bar 48 to the ends of which are connected the upper ends of a pair of chains 49. These chains may be covered by leather or rubber sleeves 50 to prevent damage to the boat B. The lower ends of the chains 49 are connected as at 51 to the forward ends of the side members 24 of the cradle C.

When transporting the boat from place to place by means of a towing vehicle (not shown) adapted to be connected to the hitch 20, the boat is secured against movement on the cradle C in the manner previously described, and, of course, with the cradle in horizontal position wherein the links 33 are folded, as illustrated in Fig. 1. The cradle is secured in horizontal position by drawing the cable 42 taut so as to bring the bar 48 against the bracket 47 in which the chains 49 are extended to exert a slight lift on the forward end of the cradle such as to maintain it in horizontal position. In this position of the cradle C it is forwardly on the frame F to occupy a position such that its rear end is supported on the rollers 21.

To launch the boat B from the trailer, it is first necessary to so loosen the cable 42 as to permit it to be disengaged from the pulley 46 thus releasing the cable, the bar 48, and the chains 49. This is followed by rotating the drum 38 to wind the cable thereon thereby pulling the chains upwardly to cause the bar 48 to swing to the top side of the boat B so that continued pull on the cable causes the front end of the cradle C to rise. The positions of these parts are shown in Fig. 2. As it rises the whole cradle swings upwardly and rearwardly about the rollers 21 as a center as shown in Fig. 2. With this cradle movement the links 33 are swung upwardly about the pivots 34, and once they pass an upper dead center position they then swing downwardly and rearwardly to the position shown in Fig. 3.

Under this link motion the cradle is moved rearwardly on the rollers until it occupies the position shown in Fig. 3 wherein its rear end portion is extended rearwardly and downwardly from the rollers with the whole cradle occupying an inclined position. The cradle can be held in this position by tightening on the cable, and where the straps 31 have been previously unbuckled, the boat is free to slide off of the cradle into the water, assuming, of course, that the trailer has already been backed to a position adjacent the water.

To retrieve the boat it can be moved back onto the cradle while the latter is in the position shown in Fig. 3, whereupon by first restrapping the boat on the cradle and then actuating the cable 42 to pull the cradle forwardly, through the action of the links 33, the cradle is restored to horizontal position on the trailer frame.

The final operation to restore the cable 42 to its original position is to pass it around the pulley 46 so that upon tightening of the cable the cradle is held against movement to permit safe transporting of the boat.

Although I have herein shown and described only one form of boat trailer embodying my invention, it is to be understood that various changes and modifications may be made therein without departing from the spirit of the invention and the spirit and scope of the appended claims.

What I claim is:

1. A boat trailer, including: a trailer frame; a boat-supporting cradle normally horizontal on said frame; rollers on the rear end of said frame normally supporting the rear end of said cradle; links permanently pivoted to said frame and to said cradle at points forwardly of the pivot of said links to said frame whereby, upon lifting the forward end of said cradle it will be tilted upwardly and rearwardly about said rollers and said links actuated to cause said cradle to be moved rearwardly on said rollers so as to project the rear end of said cradle downwardly from the rear end of said frame; a boom fixed on said frame; a winch drum mounted on the boom; a pair of flexible members connected at spaced points to the front end of said cradle; a spreader bar connected to said members; and a cable connected to said spreader bar, movably mounted on said boom, and wound on said drum whereby, through rotation of said drum in one direction the cable can be actuated to elevate said bar and said members to so lift said cradle.

2. A boat trailer, including: a trailer frame; a boat-supporting cradle normally horizontal on said frame; rollers on the rear end of said frame normally supporting the rear end of said cradle; links permanently pivoted to said frame and to said cradle at points forwardly of the pivot of said links to said frame whereby, upon lifting the forward end of said cradle it will be tilted upwardly and rearwardly about said rollers and said links actuated to cause said cradle to be moved rearwardly on said rollers so as to project the rear end of said cradle downwardly from the rear end of said frame; a boom fixed on said frame; a winch drum mounted on the boom; a sheave mounted on said boom; a pair of flexible members connected at spaced points to the front end of said cradle; a spreader bar connected to said members; and a cable connected to said spreader bar, movably mounted on said boom, and wound on said drum whereby, through rotation of said drum in one direction the cable can be actuated to elevate said bar and said members to so lift said cradle, and when said drum is rotated in the other direction and the cable is reaved about the sheave to pull said cradle forwardly on said rollers and restore it to horizontal position on said frame.

3. A boat trailer as embodied in claim 2, wherein means is provided on the boom disposed in the path of movement of said bar following restoration of said cradle to horizontal position, for limiting movement of said bar upwardly under the pulling action of the cable whereby said cradle is retained in horizontal position.

4. A boat trailer, including: a trailer frame; a boat-supporting cradle movably mounted on said frame; cable means mounted on said frame and connected to the forward end of said cradle, said means operable to lift the forward end of said cradle and tilt said cradle rearwardly; and links at one end permanently pivoted to an intermediate portion of said frame, and at the other end permanently pivoted to the forward portion of said cradle in advance of the pivot of the first-mentioned link ends, whereby, through actuation of said means to tilt said cradle rearwardly the links will be freely swung upwardly and rearwardly past a dead-center position thereby moving said cradle rearwardly and downwardly to effect launching of a boat from said cradle.

5. A boat trailer, including: a trailer frame; a cargo-supporting cradle normally horizontal on said frame; links having one end pivoted to said frame and the other pivoted to said cradle at points forwardly of the pivots of said links to said frame in the normal boat carrying position of the cradle whereby, through lifting the forward end of said cradle and at the same time exerting a force rearwardly on said cradle said links will be actuated to cause said cradle to move rearwardly on said frame to a limited projecting position at the rear end of the latter; and cable means mounted on the forward end of said frame and operatively connected to the forward end of said cradle, said cable means being operable to lift the forward end of said cradle and force it rearwardly whereby, the links will be actuated to move said cradle rearwardly on said frame to said position.

6. A boat trailer is embodied in claim 5, wherein said cable means includes an upstanding boom fixed to the forward portion of said frame and its upper end disposed to the rear of said cradle when the latter is in its extreme forward horizontal position on said frame, a winch provided with a cable having its free end movably supported on the upper end of the boom, depending therefrom, and connected to the forward end of said cradle whereby through pulling of the cable upwardly by the winch said cradle can be lifted and moved rearwardly on said frame.

7. A boat trailer as embodied in claim 6, wherein means is provided on the boom for detachably securing the depending portion of the cable to the boom when said cradle is positioned horizontally on said cradle so as to hold the latter in said position.

References Cited in the file of this patent

UNITED STATES PATENTS

| | | |
|---|---|---|
| 1,038,809 | Williams | Sept. 17, 1912 |
| 1,544,942 | Schmidt | July 7, 1925 |
| 2,182,259 | Konicek | Dec. 5, 1939 |
| 2,405,299 | Godwin | Aug. 6, 1946 |
| 2,503,590 | Ormsby | Apr. 11, 1950 |
| 2,534,156 | Wyatt et al. | Dec. 12, 1950 |
| 2,576,001 | Daniels | Nov. 20, 1951 |
| 2,700,480 | Triplett | Jan. 25, 1955 |
| 2,711,259 | Jones | June 21, 1955 |
| 2,741,383 | Leckert | Apr. 10, 1956 |
| 2,808,953 | Whitney | Oct. 8, 1957 |
| 2,818,296 | Brennan et al. | Dec. 31, 1957 |